Dec. 27, 1938. C. J. RANDALL 2,141,405
APPARATUS FOR MANUFACTURING RUBBER STRIPS
Filed Aug. 10, 1937 4 Sheets-Sheet 1
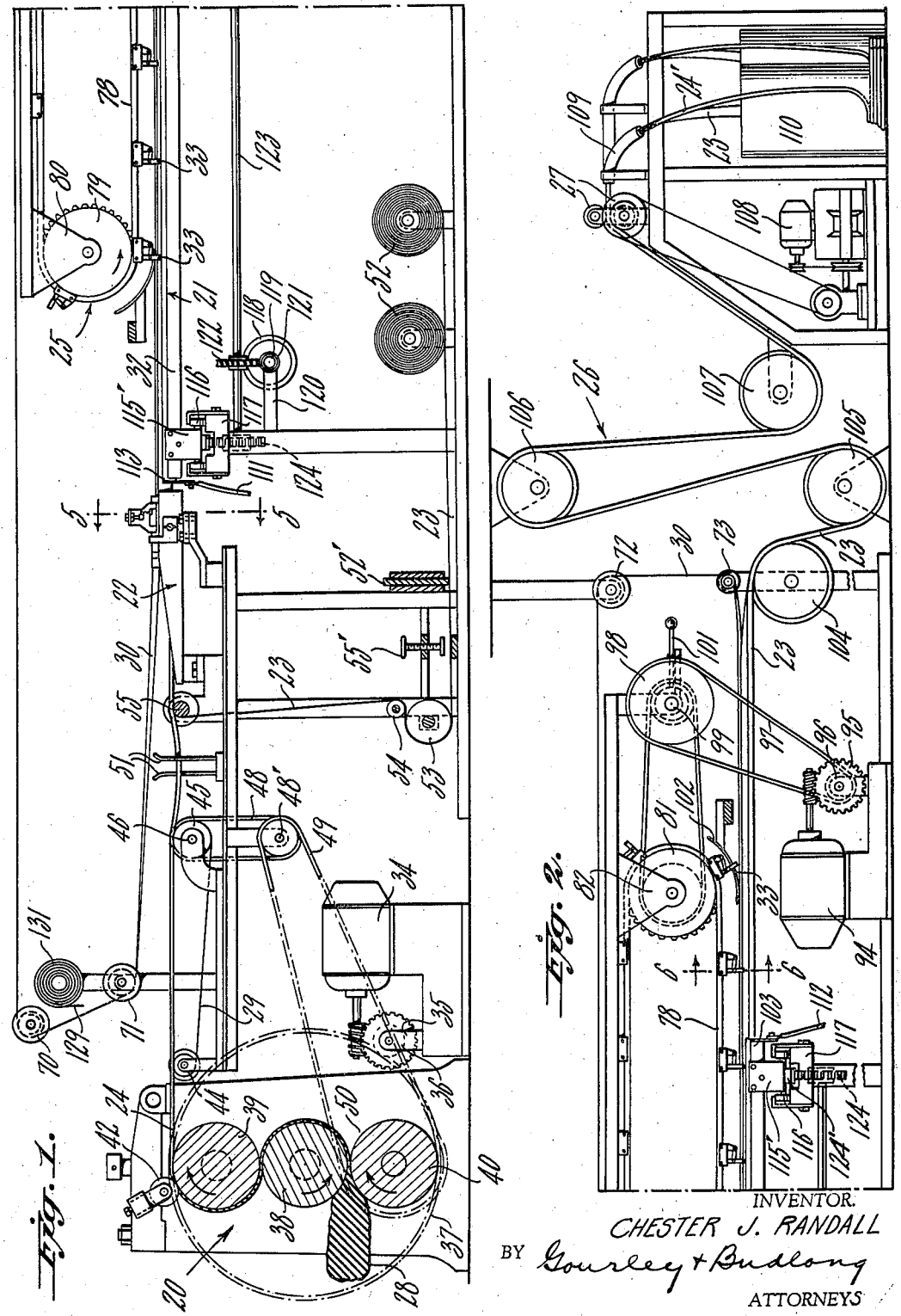
INVENTOR.
CHESTER J. RANDALL
BY Gourley & Budlong
ATTORNEYS Dec. 27, 1938.  C. J. RANDALL  2,141,405
APPARATUS FOR MANUFACTURING RUBBER STRIPS
Filed Aug. 10, 1937  4 Sheets-Sheet 2
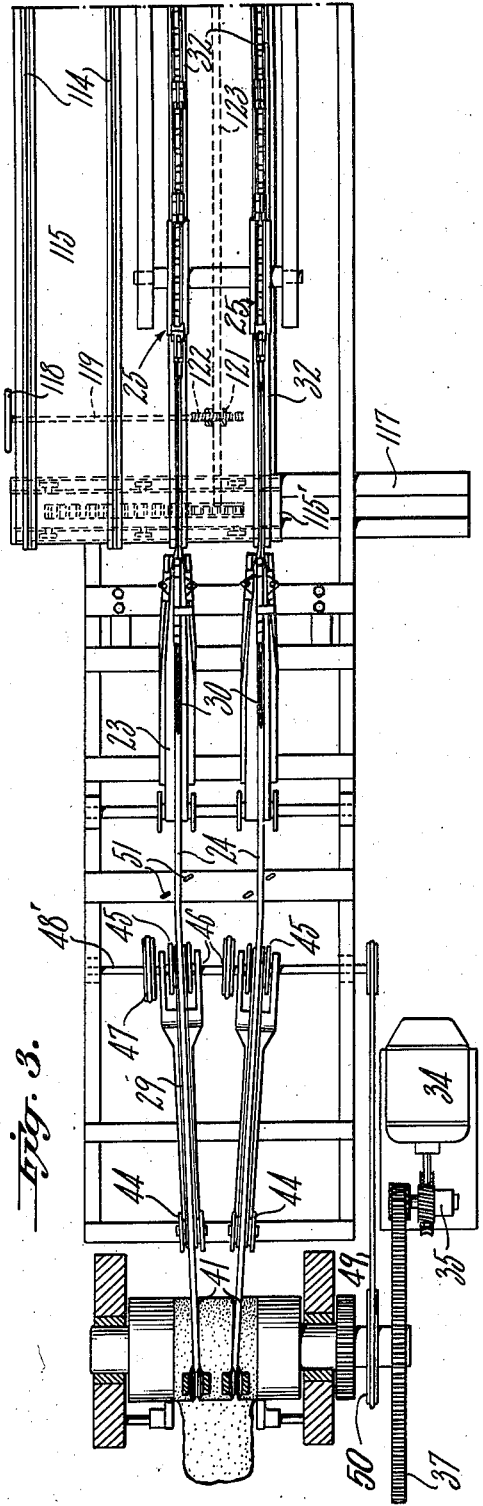
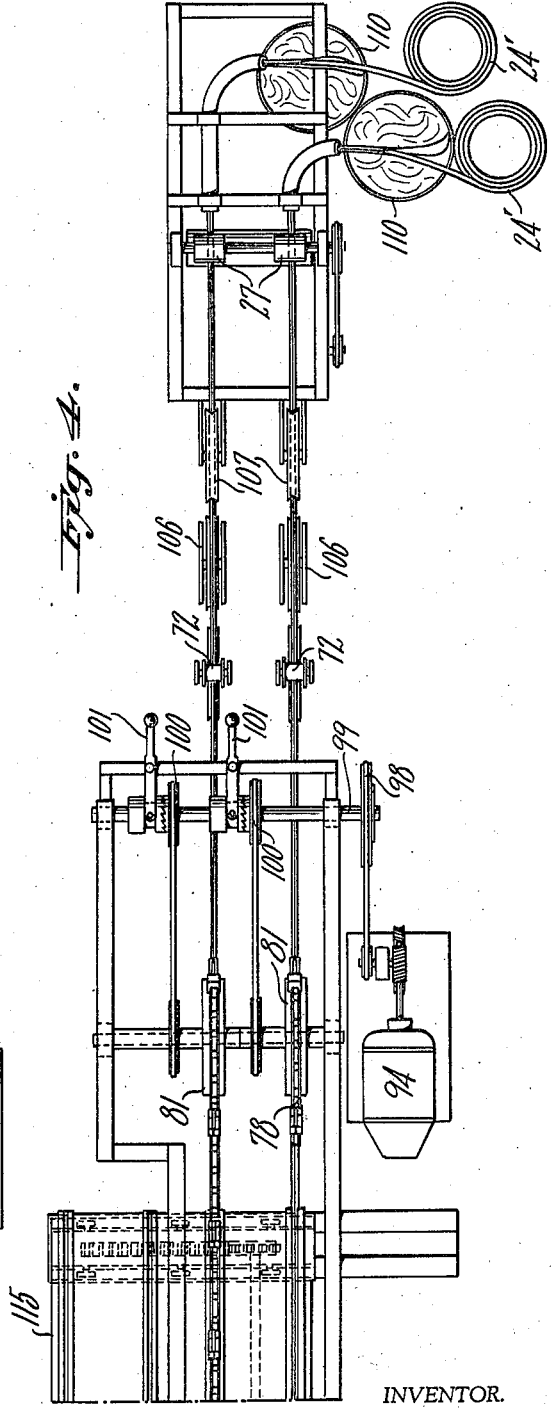
INVENTOR.
CHESTER J. RANDALL
BY Gourley & Budlong
ATTORNEYS Dec. 27, 1938.   C. J. RANDALL   2,141,405
APPARATUS FOR MANUFACTURING RUBBER STRIPS
Filed Aug. 10, 1937   4 Sheets-Sheet 3
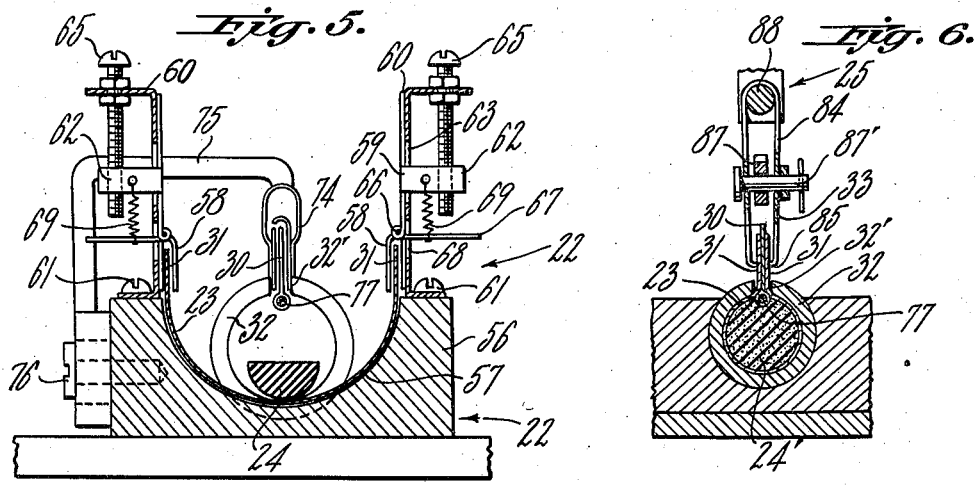
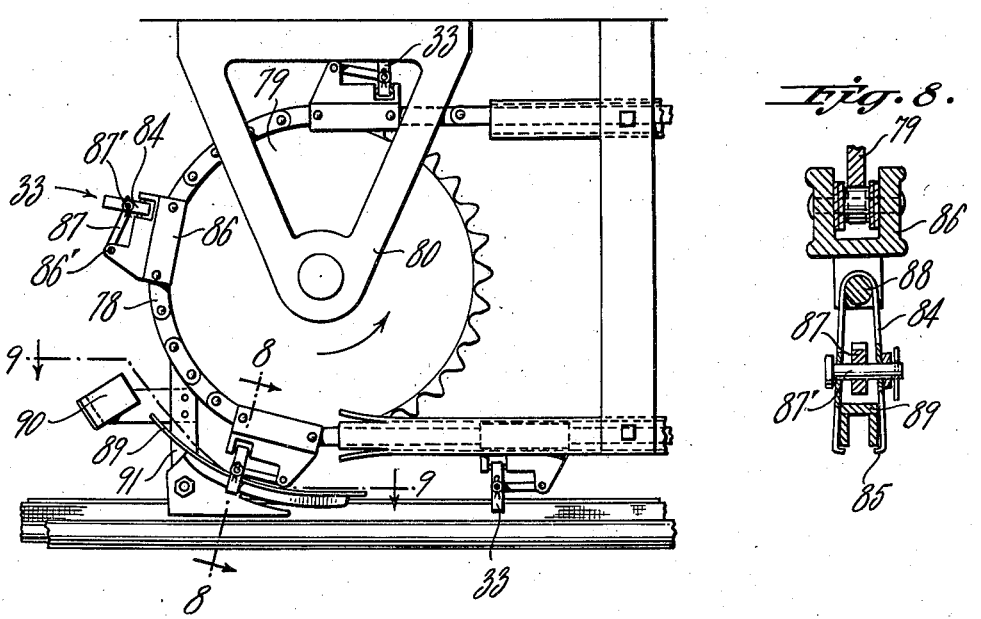
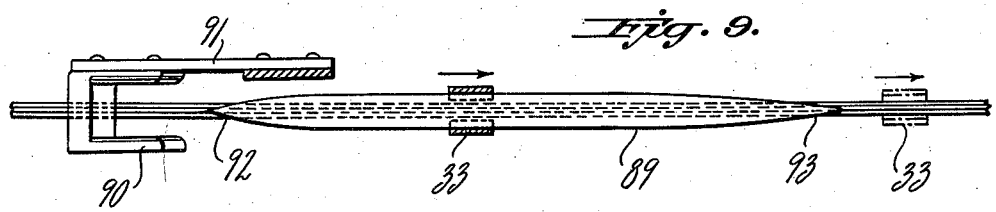
INVENTOR.
CHESTER J. RANDALL
BY Gourley + Budlong
ATTORNEYS Dec. 27, 1938.   C. J. RANDALL   2,141,405
APPARATUS FOR MANUFACTURING RUBBER STRIPS
Filed Aug. 10, 1937   4 Sheets-Sheet 4
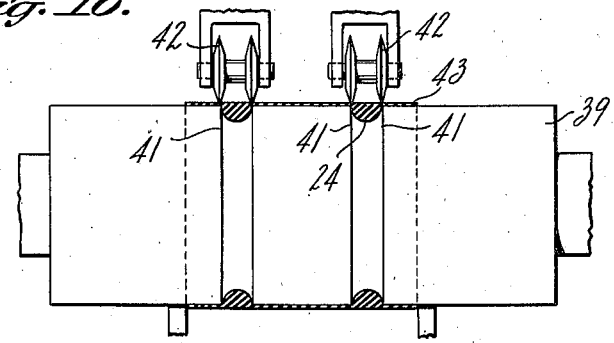
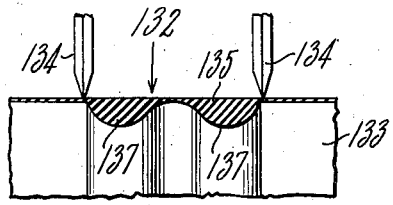
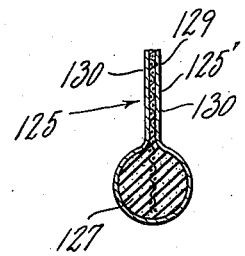
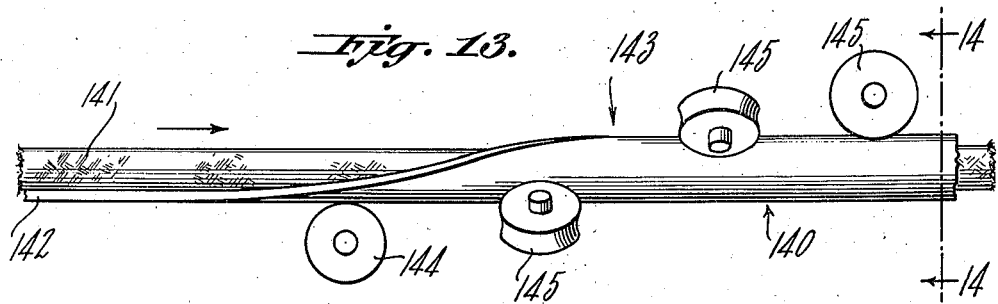
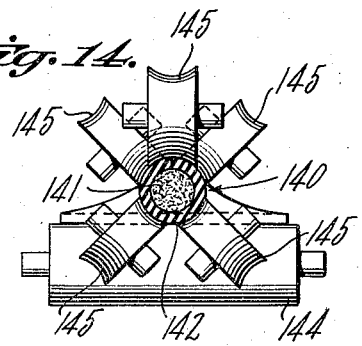
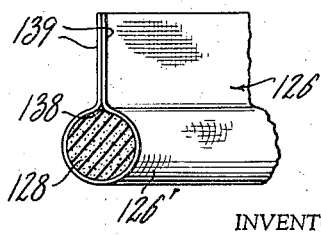
INVENTOR.
CHESTER J. RANDALL
BY Gourley & Budlong
ATTORNEYS Patented Dec. 27, 1938

2,141,405

UNITED STATES PATENT OFFICE 2,141,405

APPARATUS FOR MANUFACTURING RUBBER STRIPS

Chester J. Randall, Naugatuck, Conn., assignor, by mesne assignments, to United States Rubber Company, New York, N. Y., a corporation of New Jersey Application August 10, 1937, Serial No. 158,280

13 Claims. (Cl. 18—4)

This invention relates to an improved apparatus for manufacturing rubber strips of extended length provided or not provided with an outer covering as may be desired. The invention relates particularly to an apparatus for manufacturing sponge rubber strips in a continuous operation by calendering uncured sponge rubber compound into strips and continuously conveying the strips from the calender and vulcanizing and blowing the rubber compound within a temporary or permanent outer covering.

Heretofore rubber strips have been vulcanized in a vulcanizing press having separable mold cavities. Such operations are intermittent and are relatively slow and cannot be utilized for making sponge rubber strips of greater length than the mold cavities.

It has been proposed heretofore to manufacture sponge rubber strip material of extended length by folding a strip of fabric around a strip of uncured sponge rubber compound and pulling the strip of fabric containing the sponge rubber compound through a heated vulcanizing tube to blow and vulcanize the rubber compound. The strip of fabric was folded in the shape of a tube around the strip of uncured sponge rubber compound and the longitudinal edges of the fabric strip were brought together to provide a flange along the fabric tube. The vulcanizing tube was provided with a longitudinal slit to receive the flange on the fabric strip when the tubular portion of the fabric tube containing the rubber compound was drawn through the vulcanizing tube.

In the manufacture of sponge rubber strips of extended length by the foregoing procedure an imperfect product was often produced due to the overflow of the sponge rubber compound between the longitudinal edges of the fabric strips, or due to the fabric strip becoming wrinkled or jammed while passing through the vulcanizing tube and in some instances due to the failure of the rubber to uniformly fill the fabric tube when completely blown.

In accordance with my invention rubber strips of extended length with temporary or permanent coverings are manufactured in an apparatus comprising a vulcanizing tube and a fabric conveyor as referred to above, or other type of flexible conveyor strip. In the manufacture of the sponge rubber strips such difficulties and imperfections as mentioned above in reference to the prior practice are eliminated by forming the strips of uncured sponge rubber compound to a definite predetermined size, coordinating the rate of feed of the strips to conform to the rate of feed of the fabric or conveyor strips as they pass through the vulcanizing tubes, providing means for preventing overflow of the rubber compound between the edges of the conveyor strips, and uniformly pulling the conveyor strips through the vulcanizing tubes by relatively closely spaced clamps which grip the flange of the conveyor strips at relatively closely spaced intervals.

This invention will be more clearly understood by referring to the following description and accompanying drawings, in which:

Fig. 1 is a side elevational view of the head end of the apparatus embodying this invention, and having the tail end of the machine removed therefrom along the dot-and-dash lines at the right of the view;

Fig. 2 is an elevational view of the tail end of the machine having the right end removed along the dot-and-dash lines at the left of the view, duplicate parts being omitted between the dot-and-dash lines in Figs. 1 and 2;

Figs. 3 and 4 are top plan views respectively of the portions of the machine shown in Figs. 1 and 2 with a portion of the overflow eliminating or ridge removing strip and supports therefor removed;

Fig. 5 is a cross sectional detailed view of the folding mechanism for the temporary or permanent rubber strip covering and conveyor for the strip, and also including a cross section of the overflow eliminating strips;

Fig. 6 is a cross sectional detailed view of clamping means for conveying the rubber strip covering, or conveyor through a vulcanizing tube;

Fig. 7 is a side elevational view of the head end of the clamp carrier and mechanisms for causing the clamps to grip the rubber strip covering or conveyor;

Fig. 8 is a cross sectional detailed view of the clamp carrier and clamp along line 8—8 of Fig. 7;

Fig. 9 is a part sectional and part plan view taken on line 9—9 of Fig. 7 and showing a guide for operating the clamps into a clamp engaging position and showing a clamp cooperating therewith.

Fig. 10 is a front view of a calender roll for forming strips of plastic rubber;

Fig. 11 is a fragmentary view of the modification of the forming groove shown in Fig. 10;

Fig. 12 is a cross sectional view of a vulcanized rubber strip having a reinforcing strip incorporated therein;

Fig. 13 is a modification of the apparatus showing a mechanism for folding an uncured rubber covering around a preformed core;

Fig. 14 is an end view of the mechanism shown in Fig. 13 along the lines 14—14;

Fig. 15 is an isometric view of a finished vulcanized rubber strip having a permanent outer covering adhered thereto.

The apparatus illustrated and described herein may be used in the manufacture of strips of extended length other than sponge rubber, but it is particularly useful in the manufacture of sponge rubber strip material either with or without an outer covering which may be used for sealing or packing strips. For convenience the apparatus is illustrated and described in reference to the manufacture of sponge rubber strip material having no outer covering. The apparatus illustrated in the drawings is adapted to manufacture two rubber strips simultaneously, but of course it will be understood that it may be made to manufacture one or more strips at the same time. Since the mechanism for manufacturing each strip is alike only one will be described in detail.

Referring particularly to Figs. 1 and 2, the apparatus embodying this invention comprises a calender 20, a vulcanizing apparatus 21, a mechanism 22 for folding a flexible conveyor strip 23 around a strip of sponge rubber compound 24, and a conveying mechanism 25 for carrying the conveyor 23 containing the rubber strip 24 through the vulcanizing apparatus 21 in which the rubber compound is blown and vulcanized and discharged from the rear end as shown in Fig. 2. The blown rubber strip is then passed through a circuitous cooling path 26 and is finally passed through breakdown rolls 27, which squeeze the rubber and break up the cells therein. The conveyor 23 is then stripped from the blown sponge rubber strip 24'. In the operation of the apparatus a mass of compounded sponge rubber 28 is placed in the bottom of the calender 20 and formed into the strips 24 of uniform cross sectional area. The strips 24 are conveyed by an intermediate conveyor 29 from the calender 20 and delivered to the conveyor 23.

As shown in detail in Fig. 5 the conveyor 23 is folded about the strip of rubber compound 24. At this point a strip 30 is inserted between the longitudinal edges 31 of the conveyor 23 to prevent the sponge rubber compound from flowing between the edges 31 after the rubber compound 24 has been drawn into the tube 32 and is being vulcanized and blown to the condition shown in Fig. 6. The longitudinal edges 31, with the strip 30 inserted therebetween, are drawn in and brought together within the longitudinal slot 32' of the tube 32. After the tubular portion of the conveyor 23 enters the tube 32 the clamps 33 carried by the conveying mechanism 25 grip the edges 31 of the conveyor 23 and pull it with the strip of rubber compound through the vulcanizing tube 32. The clamps 33 are spaced relatively close together so that the force necessary to draw the conveyor through the tube 32 will be distributed along the length of the tube and thereby prevent the conveyor 23, which is preferably made of fabric, from being torn, stretched or wrinkled.

The calender 20 is driven by a motor 34 through a gear mechanism 35 provided with a gear 36 which drives a large gear 37 keyed to the shaft of the middle calender roll 38. The upper and lower calender rolls 39 and 40 respectively are driven from the middle calender roll 38 by gears not shown. As shown in Fig. 10, the upper calender roll is provided with grooves 41 in which the strips 24 of sponge rubber compound are formed. One groove is provided for each conveying mechanism 29 and 25 and vulcanizing tube 32, comprising a strip manufacturing unit. The sponge rubber compound calendered from the mass 28 between the rolls 38 and 40 passes upwardly around the roll 38 and between the rolls 38 and 39 where it is squeezed into the grooves 41. A pair of rotary knives 42 cooperate with the edges of the grooves 41 adjacent to the top of the periphery of the roll 39 for the purpose of severing the strip 24 of rubber from the flash 43 of the calendered compound. The cross-sectional area of the grooves 41 is of predetermined dimensions and as the knives 42 trim the flash 43 from the calendered stock, the strip 24 is formed with a predetermined cross sectional area.

The intermediate conveyors 29 diverge from one another towards the vulcanizing tubes 32 to provide for the greater spacing between the vulcanizing tubes 32 than the strip forming grooves 41. The conveyors 29 are separately supported on pulleys 44 and 45 and are driven by the pulleys 45 which are keyed to separate shafts 46. A pulley 47 is keyed to each shaft 46. The pulleys 47 are driven by separate belts 38 running on pulleys keyed to a single shaft 48' driven by a belt 49 cooperating with a pulley 50 secured to the shaft of the bottom calender roll 40. The geared ratio between the mechanism for driving the calender 20 and the mechanism for driving the intermediate conveyor 29 is such that the conveyor is driven at the same speed at which the strip 24 of rubber compound is calendered.

The strip 24 of rubber compound is led from the intermediate conveyor 29 to the conveyor 23 through a pair of guides 51. The conveyors 23 for the respective tubes 32 are led from reels 52 positioned underneath the machine. The lower edge of a sliding weight 52' cooperates with the conveyor strip 23 to smooth it out. The conveyor 23 is led towards the head end of the machine in contact with a pulley 53 and a take-up pulley 54 upwardly over a pulley 55 where the strip 24 of uncured rubber contacts with the conveyor. In the event any one of the conveyor strips 23 is not being used, a screw clamp 55' is provided to prevent the strip from being pulled along by the others.

As shown in detail in Fig. 5 the folding mechanism 22 for each unit has a base 56 provided with a trough 57 for the reception of the conveyor 23. The conveyor 23 conforms to the shape of the trough and the longitudinal edges 31 are held against the sides of the trough 57 by means of spring guides 58 arranged on each side of the trough. The spring guides 58 are supported in adjustable slides 59 carried by supports 60 which are secured to the base 56 by screws 61. The slides 59 are provided with arms 62 which extend through openings 63 in the supports 60 and are adjustable by screws 65 to position the guides in reference to the upper edges 31 of the conveyor 23. The guides 58 are pivoted at 66 and are provided with arms 67 which extend through openings 68 in the support 60. Springs 69 are attached at one of their ends to the arms 67 and at their other ends to the arms 62 secured to the slides 59 for the purpose of resiliently urging the guides 58 towards the edges 31 of the conveyor 23. When one reel is used up, a joint is formed in the conveyor to guide the conveyor from the next succeeding reel through the vulcanizing tube, and when the joint arrives at the guide 58 the arm 67 is pressed downwardly by the operator to permit the joint to pass.

Referring to Figs. 1, 2 and 5, the strip 30 for preventing the overflow of the sponge rubber compound between the edges 31 of the fabric conveyor 23 is preferably made in the form of a continuous belt which is supported at the head end of the machine by pulleys 70 and 71 and at the rear end of the machine by pulleys 72 and 73. The strip 30 is led from the pulley 71 downwardly toward the folding apparatus 22 between the edges 31 (Fig. 5) of the conveyor 23 at a point about opposite the edge guides 58 and is passed through a spring guide 74. It is impractical to make the strip 30 in continuous woven lengths without joints. The spring guides, being resilient, permit the joints to pass through without being jammed. The guide 74 is secured to an arm 75 which is supported on the base 56 and is adjustable in a vertical direction by means of the slot and screw connection 76 to make its height conform to strips of different widths. The strip 30 is arranged in alignment with the slot 32' in the vulcanizing tube 32 and is provided with a bead 77 which extends just within the tube. As the conveyor 23 is drawn within the tube 32 by means of the clamps 33 the edges 31 of the conveyor are drawn inwardly by the sides of the slot 32' and are positioned on each side of the strip 30. Immediately after the edges 31 are drawn into the slot 32' of the tube 32, the clamps 33 in succession clamp the strip 30 and the edges together in the position shown in Fig. 6 and the strips 23 and 30 are drawn along together. When the strip 24 of sponge rubber compound is expanded against the bead 77 the seams between the edges 31 are sealed by the bead. When the conveyor 23 and strip 30 are removed from the completed core 24' a longitudinal groove is left in the core by the bead 77.

As shown in Fig. 1 the carrier clamps 33 are carried by chain 78 which is supported at the head end of the machine by sprocket 79 rotatably mounted in a bracket 80, and as shown in Fig. 2 at the rear end of the machine, the chain 78 is supported by a sprocket 81 rotatably mounted in a bracket 82. The clamps 33 are spaced relatively close to one another along the chain 78 in order to clamp the edges of the conveyor 23 at relatively closely spaced points to prevent the sponge rubber compound from being blown between the edges and to provide a uniform pull along the length of the conveyor. Referring to Figs. 6, 7, 8 and 9, the clamps 33 comprise U-shaped spring clips 84 having jaws 85, which are normally resiliently held in contact with the edges 31 of the conveyer 23. The clamps 33 are pivoted on a base 86 forming a link in the chain 78. A bar 87 pivoted at one end on a pin 87' secured to the clip 84 and at the other end on a pin 86' secured to the base 86, forms a pivotal connection between the clamp and the base. The bar 88 extending through the curved end of the spring clip 84 and secured to the base 86 limits the pivotal movement of the clamp 33. The clamps 33 travel around the sprocket 79 in the direction as indicated by the arrow in Fig. 7. As they descend they are brought into alignment with a clamp opening guide 89 by the U-shaped guide 90. The clamp opening guide 89 is supported on a bracket 91 secured to the main frame of the machine and arranged directly above the slot 32' in the vulcanizing tube 32. The guide 89 converges towards the front and rear ends and is arranged in the path of the travel of the clamps 33. When the clamps 33 pass along this path, the forward end 92 of the guide 89 enters the U-shaped clips 84 and causes the jaws 85 to spread and remain in the spread condition until they straddle the edges 31 of the conveyor 23. As the clamps 33 pass off of the rear end 93 of the guide 89 the jaws 85 grip the edges 31 of the conveyor 23 and tightly hold them together in contact with the strip 30 and when drawn by the chain 78 pull the conveyor 23 through the vulcanizing tube 32.

Referring to Fig. 2, the chain 78 carrying the clamps 33 is driven from the rear end of the machine by a motor 94 which drives a gear mechanism 95 having a sprocket 96 which drives a sprocket chain 97 which in turn drives a gear 98 keyed to a shaft 99. Speed controls are provided for the motors 34 and 94 to coordinate the speed of the calender 20 and the conveyor 23 so that the strips 24 of rubber compound will remain in the tubes 32 for the proper vulcanizing period and are conveyed through the tubes at the speed at which they are calendered.

As shown in Fig. 4 separate sprockets 100 are rotatably mounted upon the shaft 99 which may be directly connected thereto by separate clutch operating mechanisms 101 for individually operating the sprockets 81 of the respective vulcanizing units. The separate drives for each vulcanizing unit are provided so that if one of the units should becomes jammed or broken down it may be stopped while the other units may continue to operate.

As shown in Fig. 2 a clamp disengaging guide 102, similar to the clamp engaging slide 89, is provided at the rear end of the apparatus for causing the clamps 33 to release their grip upon the edges 31 of the conveyor 23 after it leaves the rear end 103 of the vulcanizing tube 32. The conveyor 23 containing the blown and vulcanized sponge rubber strip then passes over a pulley 104, at which point the strip 30 is pulled from between the edges 32 of the conveyor and is returned to the front end of the machine. After passing over the pulley 104 the conveyor 23 extends downwardly under a pulley 105 and upwardly through its cooling circuit 26 over a pulley 106 and then downwardly around a pulley 107 and thence through the breakdown rolls 27 which are positively driven from a motor 108. The vulcanized strip and conveyor then passes through a pipe 109 and is discharged above containers 110 where an operator stands and strips the conveyor 23 from the vulcanized strip 24', the latter being formed in a coil outside of the container 110 and the former being deposited in the container.

The vulcanizing tubes 32 are preferably made of metal and are heated by the resistance of metal to an electrical current supplied by the terminals 111 and 112 connected respectively to the front end 113 of each tube and the rear end 103 as shown in Figs. 1 and 2. The tubes are preferably insulated with a heat insulating material such as asbestos which for clearness of illustration is not shown in the drawings.

As shown more clearly in Figs. 3 and 4 a set of vulcanizing tubes 32 is provided for the set of calender grooves 41 and conveyor mechanisms 25 which are adapted to make sponge rubber strips of a given size, and a separate set of vulcanizing tubes 114 are provided for making sponge rubber strips of a different size. The set of tubes 114 are interchangeable with the vulcanizing tubes 32 so that the conveyor mechanisms 25 may cooperate therewith. The vulcanizing tubes 32 and 114 are mounted upon laterally movable table 115 carried by supports 115' positioned at each end of the table. The supports 115' are mounted on rollers 116 carried by tracks 117 supported on the frame of the machine. The tubes 114 may be shifted to the position occupied by the tubes 32 as shown in Figs. 3 and 4 by operating the hand wheel 118 which is fixed to a shaft 119 rotatably mounted in brackets 120 beneath the vulcanizing tubes in the frame of the machine. A worm 121 is keyed to the shaft 119 and cooperates with the worm wheel 122 keyed to the longitudinal shaft 123 suitably mounted in the frame of the machine. The shaft 123 is provided at each end with gears 124 which cooperate with a rack 124' secured to each of the supports 115'. Before the tubes 114 are shifted to the position of the tubes 32 the conveyors 23 and the strips 30 are removed from the tubes 32. After the tubes 114 are shifted underneath the conveying mechanisms 25, the conveyor strips 23 and the overflow preventing strips 30 are inserted in the tubes in the usual manner by leading the ends of the conveyor strips 30 through the folding apparatus 22 and inserting the strips 23 and 30 in the first clamp 33. Upon setting the apparatus in operation the clamps 33 in succession grip the strips 23 and 30 and pull them through the tubes. In order to regulate the size of the strip 24 of sponge rubber compound to conform to the size of the tubes 114, it is necessary to substitute a new calender roll having different sizes of grooves for the top calender roll 39 as shown in Figs. 1 and 3.

The apparatus has been described so far in reference to the manufacturing of sponge rubber strips having no outer covering. If it is desired to make packing strips 125 and 126 with a permanent outer covering 125' and 126' as shown respectively in Figs. 12 and 15 in cross section, the outer coverings may be supplied from the reels 52 as previously described, but in this case the covering will become vulcanized to the sponge rubber compound during its passage to the vulcanizing tubes. Of course in such case the covers 125' and 126' are allowed to remain on the vulcanized sponge rubber cores 127 and 128 respectively after the packing strip is passed through the breakdown rolls 26.

The packing strip shown in Fig. 12 is provided with a permanent reinforcing insert 129 which is positioned between the longitudinal edges 130 of the outer covering 125' and extends into the core of the sponge rubber 127. In order to incorporate the insert 129 in the packing strip, the reinforcing insert is led from a reel 131 and is substituted for the overflow preventing strip 30 by passing the insert 129 over the pulley 71 (Fig. 1) and through the guide 74 (Fig. 5) to the clamps 33. In this manner the reinforcing strip 129 is incorporated in the packing strip and of course is not removed from the strip at the rear end of the machine as in the case of the overflow preventing strip 30. It is preferred to shape the strip of sponge rubber compound which forms the core 127 in a specially formed groove 132 as shown in the calender roll 133 (Fig. 11) which may be substituted for the roll 39 in Fig. 1. The groove 132 is provided with a pair of knives 134 cooperating with its edges in the manner described with reference to Fig. 10 and for the same purpose as the knives 42. The groove 132 forms a strip of sponge rubber compound 135 having beads 137 formed on each side of its center line. The strip 135 is deposited upon the outer covering or conveyor strip 125' and is conveyed underneath the reinforced insert 129 which is held in the center guide 74 (Fig. 5). The beads 137 are folded about the lower end of the insert 129 by the folding mechanism 22.

In the manufacture of the packing strip shown in Fig. 15 the outer covering 126' is merely substituted for the conveyor 23 and the overflow preventing strip 30 is eliminated. In this case the overflow preventing strip 30 is not required, because the product is not deleteriously effected if some of the sponge rubber compound flows into the peak 138 between the longitudinal edges 139 of the fabric covering 126'.

The apparatus embodying this invention is also adapted to manufacture strips having a preformed core provided with an outer covering of rubber or other plastic materials. Referring to Figs. 13 and 14, the strip 140 is preferably provided with a fabric core 141 and an outer covering 142 of sponge rubber, as shown in cross section in Fig. 14. The covering 142 is folded around the core 141 by a folding mechanism 143 comprising a cylindrical roller 144 arranged at the bottom of the folding mechanism, and a plurality of grooved rollers 145 arranged radially around the core 141 and suitably supported in a frame, not shown. The folding mechanism may be inserted between the intermediate conveyor 29 and the roller 55 supporting the main conveyor 23 shown in Fig. 1. In the manufacture of the strip 140 the outer covering 142 is calendered by the calender 20 into flat strips and delivered to the roller 144 by the intermediate conveyor 29, and is led through the folding mechanism 143 on to the conveyor strip 23 and is drawn through the vulcanizing apparatus 21 by means of the main conveying mechanism 25. In such manufacture the overflow preventing strip 30 is eliminated and the core 141 is fed from a reel which may be substituted for the reel 131 shown in Fig. 1. The core 141 extends from the reel and is led downwardly onto the flat rubber strip 142 and is drawn through the folding apparatus 143. In the passage of the core 141 and flat strip 142 through the apparatus, the rollers 145 fold the strip 142 around the core 141 and when so folded they are deposited upon the conveyor 23 which is folded around the covered core 141 by the folding mechanism 22 in the manner described in reference to Figs. 1 and 5.

While I have described an embodiment of my invention it will be understood that changes may be made in the details without departing from the spirit and scope of my invention as defined in the appended claims.

Having thus described my invention what I claim and desire to protect by Letters Patent is:

1. An apparatus comprising the combination of a calender and a plurality of vulcanizing tubes, said calender having cooperating rolls, one of said rolls having a plurality of circumferential grooves therein for forming a plurality of plastic strips of vulcanizable sponge rubber compound, and means for conveying said strips of rubber compound through said vulcanizing tubes at the rate of speed at which they are calendered to vulcanize and blow said strips, means for cooling the vulcanized and blown sponge rubber strips, and means for breaking down said strips.

2. An apparatus comprising the combination of a calender and a vulcanizing tube, said calender having cooperating rolls, one of said rolls having a pair of circumferential grooves therein for forming a plastic strip of vulcanizable rubber having a pair of beads connected by a flat surface, means for positioning a reinforcing strip of material above the flat surface of the rubber strip, means for folding the flat surface of said rubber strip against said reinforcing strip, means for drawing said rubber strip and reinforcing strip through said vulcanizing tube and bonding said rubber strip to said reinforcing strip.

3. An apparatus for making vulcanized rubber strips, comprising a vulcanizing tube having a lengthwise slit therein adapted to receive the outwardly extending lengthwise margins of a conveyor having a tubular shaped portion enclosed in said vulcanizing tube, and clamping means acting on said margins of said conveyor at points along said slit to draw the tubular portion of said conveyor through said vulcanizing tube.

4. An apparatus for making vulcanized strips of rubber, comprising a vulcanizing tube having a lengthwise slit therein adapted to receive the outwardly extending lengthwise margins of a flexible conveyor having a tubular shaped portion enclosed in said tube, means for clamping the margins at spaced intervals along said slit, and means for drawing said clamping means longitudinally of said slit.

5. An apparatus for making vulcanized strips of rubber, comprising a vulcanizing tube having a lengthwise slit therein adapted to receive the outwardly extending lengthwise margins of a flexible conveyor having a tubular shaped portion enclosed in said tube, a clamp carrier, extending along said slit, clamps secured to said carrier, means for causing said clamps to grip the margins of the flexible conveyor at one end of said vulcanizing tube, means for causing said clamps to release their grip upon the margins of the conveyor at the opposite end of said vulcanizing tube, and means for driving said clamp carrier.

6. An apparatus for making vulcanized strips of rubber, comprising a vulcanizing tube having a lengthwise slit therein adapted to receive the outwardly extending lengthwise margins of a flexible conveyor having a tubular shaped portion enclosed in said tube, means for clamping the margins at spaced intervals along said slit, and means for drawing said clamping means longitudinally of said slit, a guide for folding the flexible conveyor into the tubular shape and for guiding the conveyor into the forward end of said vulcanizing tube with its lengthwise margins extending through said slit and the tubular portion of the conveyor extending into said vulcanizing tube.

7. An apparatus for making vulcanized strips of rubber, comprising a vulcanizing tube having a lengthwise slit therein adapted to receive the outwardly extending lengthwise margins of a flexible conveyor having a tubular shaped portion enclosed in said tube, a guide for guiding a flexible strip between the lengthwise margins of the conveyor so that the inner edge of the strip extends through said slit and into said tube, means for clamping the margins of said conveyor and strip together which extend through said slit and for pulling the tubular shaped portion of the conveyor and the inner edge of the strip through said vulcanizing tube.

8. An apparatus for making vulcanized rubber strips comprising a vulcanizing tube having a lengthwise slit therein, means for folding a flexible strip around a core in the form of a tube and with its longitudinal margins extending through said slit, and means for clamping said margins at relatively closely spaced intervals and drawing said tubular portion through said tube.

9. An apparatus for making vulcanized rubber strips comprising a vulcanizing tube having a lengthwise slit therein, means for folding a flexible strip around a core in the form of a tube and with its longitudinal margins extending through said slit, means for positioning a strip between said margins, and means for drawing said margins along said slit with said second strip positioned between the margins.

10. An apparatus for making vulcanized rubber strips comprising a vulcanizing tube having a lengthwise slit therein, a conveyor for the rubber strips having its lengthwise margins extending through said slit and a tubular portion enclosed within said vulcanizing tube, a strip interposed between the lengthwise margins of said conveyor and extending through said slit, a bead formed on the inner edge of said intermediate strip, means for clamping the margins of said conveyor and said intermediate strip, and means for drawing said clamping means along said slit in said vulcanizing tube.

11. An apparatus for making vulcanized rubber strips comprising a vulcanizing tube having a lengthwise slit therein, a flexible conveyor for the rubber strips having its lengthwise margins extending outwardly through said slit and a tubular portion enclosed within said vulcanized tube, a continuous intermediate flexible strip interposed between the lengthwise margins of said conveyor and extending outwardly through said slit, a bead formed on the inner edge of said intermediate strip and extending along said slit and within said vulcanizing tube, means comprising clamps for clamping said margins of said conveyor and said intermediate strip together, means for causing said clamps to engage said conveyor and strip at the forward end of said vulcanizing tube, means for causing said clamps to release said conveyor and strip at the rear end of said tube, and means for returning said flexible intermediate strip to the forward end of said vulcanizing tube.

12. An apparatus for making vulcanized rubber strips of different cross sections comprising a movable table, a plurality of parallel sets of vulcanizing tubes carried by said table, each set of tubes having a different internal cross section, each of said tubes having a longitudinal slit therein adapted to receive the outwardly extending lengthwise margins of a conveyor having a tubular shaped portion enclosed in its respective vulcanizing tube, a set of means for separately clamping the margins of each conveyor for one set of vulcanizing tubes, means for operating said set of clamping means along said slits, and means for moving said table to bring each set of tubes into and out of cooperation with said set of clamping means.

13. An apparatus for making vulcanized rubber strips comprising a plurality of vulcanizing tubes, each of said tubes having a lengthwise slit therein adapted to receive the outwardly extending margins of a conveyor having the tubular portion enclosed in said vulcanizing tube, a separate mechanism for drawing each of said outwardly extending margins along the lengthwise slits, a common drive for driving all of said drawing mechanisms, and means for selectively engaging each of said drawing mechanisms with and disengaging each from said common drive.

CHESTER J. RANDALL.